United States Patent
Kallio et al.

(10) Patent No.: US 10,102,010 B2
(45) Date of Patent: *Oct. 16, 2018

(54) LAYER-BASED USER INTERFACE

(71) Applicant: Idean Enterprises Oy, Helsinki (FI)

(72) Inventors: Markus Kallio, Espoo (FI); Risto Lähdesmäki, Espoo (FI); Marko Vänskä, Helsinki (FI); Petri Heiskanen, Helsinki (FI); Mika Käki, Tampere (FI)

( * ) Notice: Subject to any disclaimer, the term of this patent is extended or adjusted under 35 U.S.C. 154(b) by 87 days.

This patent is subject to a terminal disclaimer.

(21) Appl. No.: 15/227,004

(22) Filed: Aug. 3, 2016

(65) Prior Publication Data

US 2016/0342430 A1 Nov. 24, 2016

Related U.S. Application Data

(63) Continuation of application No. 12/163,104, filed on Jun. 27, 2008, now Pat. No. 9,436,346.

(30) Foreign Application Priority Data

Feb. 11, 2008 (EP) .................................... 08151269

(51) Int. Cl.
| | | |
|---|---|---|
| G06F 3/048 | (2013.01) | |
| G06F 9/44 | (2018.01) | |
| G06F 3/0481 | (2013.01) | |
| G06F 3/0482 | (2013.01) | |
| H04M 1/725 | (2006.01) | |
| G06F 3/0485 | (2013.01) | |

(Continued)

(52) U.S. Cl.
CPC .......... *G06F 9/4443* (2013.01); *G06F 3/0481* (2013.01); *G06F 3/0482* (2013.01); *G06F 3/0485* (2013.01); *G06F 3/0486* (2013.01); *G06F 3/0488* (2013.01); *G06F 9/451* (2018.02); *H04M 1/72583* (2013.01)

(58) Field of Classification Search
CPC combination set(s) only.
See application file for complete search history.

(56) References Cited

U.S. PATENT DOCUMENTS

| | | |
|---|---|---|
| 7,142,890 B2 | 11/2006 | Irimajiri et al. |
| 7,954,064 B2 | 5/2011 | Forstall et al. |

(Continued)

FOREIGN PATENT DOCUMENTS

GB 2354142 A 3/2000

OTHER PUBLICATIONS

Office Action (dated Jul. 5, 2016) of corresponding EP Application No. 12160490.4.

*Primary Examiner* — Hien L Duong
(74) *Attorney, Agent, or Firm* — Muncy, Geissler, Olds & Lowe, P.C.

(57) ABSTRACT

A layer-based user interface for computing devices. In the layer-based user interface, the functionality of the device is distributed to layers and accessed via them. Each layer is composed of a number of components or features that are typically represented by icons. The components can present, for example, data or functions to the user. The components can be interactive or uninteractive. A subset of interactive components is navigational. Navigational components are a special case of the components because of their central role in the user interface concept.

14 Claims, 2 Drawing Sheets

(51) Int. Cl.
    *G06F 3/0486*     (2013.01)
    *G06F 3/0488*     (2013.01)
    *G06F 9/451*     (2018.01)

(56) References Cited

U.S. PATENT DOCUMENTS

| | | |
|---|---|---|
| 8,111,244 B2 * | 2/2012 | Lee ............ G06F 17/30017 |
| | | 345/173 |
| 2003/0095149 A1 | 5/2003 | Fredriksson et al. |
| 2003/0169302 A1 | 9/2003 | Davidsson et al. |
| 2003/0206199 A1 | 11/2003 | Pusa et al. |
| 2004/0165012 A1 | 8/2004 | Nelson et al. |
| 2004/0233238 A1 | 11/2004 | Lahdesmaki |
| 2005/0210410 A1 | 9/2005 | Ohwa et al. |
| 2005/0246283 A1 | 11/2005 | Gwiazda et al. |
| 2006/0048075 A1 | 3/2006 | Kim |
| 2006/0190833 A1 * | 8/2006 | SanGiovanni ...... G06F 3/04883 |
| | | 715/767 |
| 2006/0253801 A1 | 11/2006 | Okaro et al. |
| 2007/0132789 A1 | 6/2007 | Ording et al. |
| 2007/0150834 A1 | 6/2007 | Muller et al. |
| 2007/0152961 A1 | 7/2007 | Dunton et al. |
| 2007/0266093 A1 | 11/2007 | Forstall et al. |
| 2008/0022228 A1 | 1/2008 | Kwon et al. |
| 2008/0052945 A1 * | 3/2008 | Matas ............ G06F 3/0485 |
| | | 34/173 |
| 2008/0143685 A1 * | 6/2008 | Lee ............ G06F 17/30017 |
| | | 345/173 |
| 2008/0172635 A1 | 7/2008 | Ross et al. |
| 2008/0234314 A1 | 9/2008 | Cai et al. |
| 2008/0263452 A1 | 10/2008 | Tomkins |
| 2009/0019401 A1 | 1/2009 | Park et al. |
| 2009/0122018 A1 | 5/2009 | Vymenets et al. |
| 2009/0172598 A1 | 7/2009 | Yamanaka et al. |
| 2009/0228824 A1 | 9/2009 | Forstall et al. |

\* cited by examiner

LAYER-BASED USER INTERFACE

CROSS-REFERENCE TO RELATED APPLICATIONS

This application is a Continuation of co-pending application Ser. No. 12/163,104, filed on Jun. 27, 2008, for which priority is claimed under 35 U.S.C. § 120; and this application claims priority of Application No. 08151269.1 filed in Europe on Feb. 11, 2008 under 35 U.S.C. § 119; the entire contents of all of which are hereby incorporated by reference.

FIELD OF THE INVENTION

The invention relates to user interfaces for computing devices.

BACKGROUND OF THE INVENTION

Different types of electronic devices have a dominant position in our daily life. Modern devices are capable of executing complex tasks and they have various functionalities. For example, in mobile phones there are many features that do not relate to the original purpose of a phone. Cameras, GPS-navigators and music players are standard features in mobile phones and more features are to be expected in the near future. Because of the vast set of features, mobile phones and other electronic devices are harder to use than in the early days. Most of the users do not have the energy needed for studying how all of the features work, so many users cannot use all of the features that the devices are capable of executing.

This problem has been recognized. Thus, usability engineers and user interface designers seek continuously new solutions for providing easier and more convenient way of using such devices. Menu structures and input devices are under continuous construction in order to provide better user experience. One good example is the recently developed touch screen technology that can be used with fingers. It is a more flexible and natural way than a keypad and easier to use than a touch screen that requires a pen for input. Even if these solutions already provide better user interfaces, there is still need for even better and different ways for using different applications. Thus, there is a continuous need for improved user interfaces.

SUMMARY OF THE INVENTION

The invention discloses a layer-based user interface. In the layer-based user interface, the functionality of the device is distributed to the layers and accessed via them. Each layer is composed of a number of components or features that are typically represented by icons. The components can present, for example, data or functions to the user. The components can be interactive or un-interactive. A subset of interactive components is navigational. Navigational components are a special case of components, because of their central role in the user interface concept.

The use of the system is based on manipulation of the components on the layers. The manipulation is typically done with touch-based finger gestures that are detected with a touch-sensing technology or any other suitable technology. There are two gestures that are the most important: a vertical and horizontal drag. The dragging gesture is common in computer systems and it comprises three phases: 1) touching the touch-sensitive component with a pointing device (e.g. finger), 2) moving the pointing device while maintaining the contact with the sensing component, and 3) lifting the pointing device from the sensing component. Horizontal and vertical refer to the direction of the dragging in phase 2.

There are several types of layouts for a layer. The layout may be, for example, scrolling or non-scrolling. The layout type defines the possible interaction with vertical gestures. The basic difference between the layouts is the number of items displayed on the layer in vertical direction. In the scrolling layout, the components may reside outside the visible screen, while in the non-scrolling layout all components must be visible on the screen in the normal mode. In an embodiment of a method according to the present invention for providing a user interface in a computing device, the method comprises arranging a plurality of components in a plurality of layers and choosing a desired feature by activating at least one of said components from at least one of the layers that are visible. In the embodiment, said layers are movable in relation to each other, wherein moving said layers is configured to make further layers visible. In the embodiment, said plurality of components are arranged into a scrollable or non-scrollable menu. In the embodiment, the components may be active components that are arranged to retrieve the visualization of the component from a network service. The visualization may be, for example, a weather forecast, an advertisement, news or any other suitable information. The layers of the embodiment may comprise sub-layers having at least one component. In the embodiment, triggering a component includes at least one of the following: time-based trigger, application-based trigger, pressure-based trigger and orientation-based trigger.

Typically, the embodiment of the method is implemented as a computer program product, wherein the program is arranged to execute the steps of the method when executed in a computing device. The computing device may be a mobile phone and comprises control means, wherein the control means are at least one of the following: a touch sensitive display, an orientation sensor and a keypad. The computing device may comprise a network connection.

In an embodiment, a scrolling layout is disclosed. For example, vertical (up-down) gestures scroll the layer in vertical dimension. When the layer has multiple components on it, the scrolling layout has an effect of scrolling the components. The current viewport defined by the physical size of the screen defines the number of components displayed simultaneously, while some of the components reside virtually outside the screen. The user can control the visible components with scrolling gestures.

In an embodiment, a non-scrolling layout is disclosed. For example, vertical (up-down) gestures collapse the layer components to the corresponding end of the screen, for example a gesture down collapses the components to the bottom of the screen and reveals a sub-layer from the other side of the screen, in this example from the top.

In an embodiment of the layer-based user interface, the navigation between layers is realized by touch gestures starting on top of a component. Navigating to the next layer in the layer hierarchy is performed by dragging the current layer by a component with a horizontal motion. The direction may be dependent on user settings, it may be different e.g. for the left- and right-handed users, or for users in different cultures. The component from which the layer is dragged, defines the target layer of the navigation process. Navigating back to the previous layer in the layer hierarchy is realized with a horizontal dragging motion to the opposite direction compared to the navigation gesture to the next layer. The back navigation gesture starts by touching the icon representing the previous layer. Such representation is typically visible on the screen on either side of the screen.

Upon navigation, the main level of the components is typically left visible (with iconic presentation) on that side of the screen where the user has dragged it with the navigational gesture. In certain cases, the main level components may be hidden. When visible, the iconic presentation of the main level components remains active so that the user can apply gestures to them as specified by the component.

In addition to displaying the main level layer components on the side of the screen, the previous level layer may have a special role in the navigation. The component that was selected in the previous layer level may be displayed with graphical or textual representation combined to the main level component representing the first selection of the user in the current navigation path. Thus, three levels of selection may be indicated, the first level and the previous level on the side of the screen, while the rest of the screen is dedicated to the currently selected layer.

In an embodiment, the top layer has a special position in the concept and its interaction differs from the other layers. As there is no previous layer (parent layer) for the top level layer, the horizontal gesture opposite to the navigation gesture may be allocated a different meaning. The allocation is dependent on the component from which the gesture is initiated.

In an embodiment, layers may contain one or more sub-layers. A sub-layer is different from a component, because it may contain a plurality of components. In addition, the behaviour of a sub-layer differs from that of a component. For example, it can not be used as a starting point of a normal navigational gesture. There can be various types of sub-layers.

In an embodiment sub-layers are not directly visible to the user in normal mode but they are opened with a suitable trigger, for example, time-based trigger, application-based trigger, pressure-based trigger or orientation-based trigger. For example, in time based gesture, the sub-layer is made visible after a certain dwell time. In pressure gesture, the sub-layer is made visible when the user's touch is done with a force exceeding a predefined threshold. The invention is not limited to these triggering methods but further triggers may be based on different functionality of the device. These triggers may be, for example, orientation or application based.

In an embodiment expanding sub-layers may be indicated to the user with visual hints or they may be completely invisible. When a trigger is detected, the presence of a sub-layer is always indicated in some visual way. In a further embodiment of sub-layers they may function as drag targets to components. Components can be dragged to a sub-layer from any other layer and the different components of the opened sub-layer may define different semantics when dropping the dragged component on them.

In an embodiment, the user interface may use a number of hardware buttons attached to the device. The buttons change their behaviour based on the selected layer and possibly on a selected component.

In an embodiment, the user interface may use so-called active icons whenever their utilization is meaningful. An active icon means that the exact representation of the icon changes based on the state behind the icon. For example, an icon representing a weather service would display a forecast in it. In certain cases, active icons can fulfil the information need of the user and thus enhance the use.

The embodiments mentioned above may be implemented independently or jointly in the device. In addition to the user interface features mentioned above, new features may be incorporated into the layers.

The benefit of the invention is that the user experience of the device is enhanced, and the layer-based user interface allows new ways of using the device. This enables the possibility of new applications, and new ways to use the existing applications.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
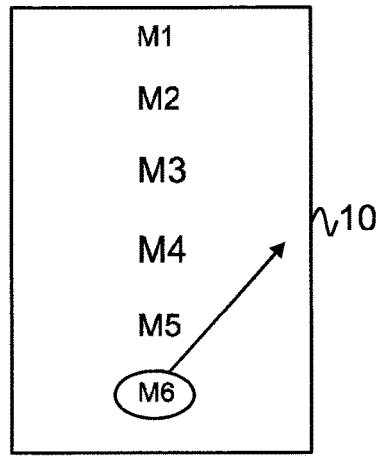
FIG. 1 is an example of a layer-based user interface.
Figure 1:
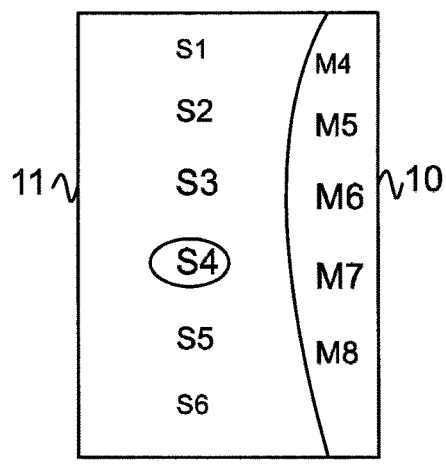
Figure 1:
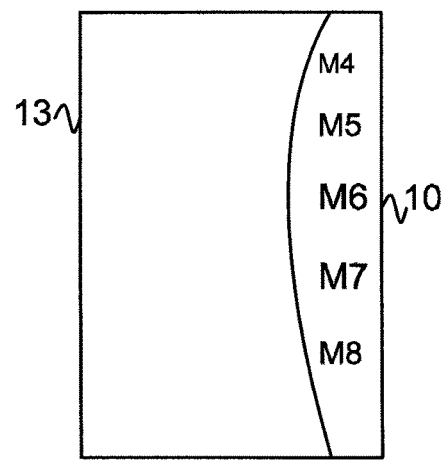
Figure 1:
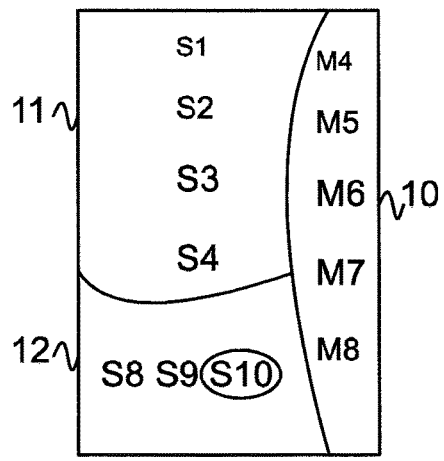

In FIG. 1, an example of using a layer-based user interface is disclosed. In the first screenshot, only layer 10 is visible and the device used is in its regular state, wherein the menu system has been activated. The contents of the actual menu vary according to the starting point, or it can be configured so that the main menu of the device is always displayed first. For example, if the menu is activated within an application, icons M1-M6 are different than in the system level. It must be noted that on layer 10 only six icons are shown due to limitations of the screen of the device of the example. However, the menu of the example includes at least eight icons. Different devices may have different screen sizes that allow a different number of menu icons. Typically, the main menu is arranged so that the complete menu can be and is shown on the screen. The device of the example does not have any keypad but it is possible that the device has a keypad and a portion of the functionality is arranged in the keypad.

The user of the device is wishing to activate application M6 on layer 10. In the device, the choosing can be made in several different ways. M6 is chosen so that it is touched with a finger or a pointing device. Then, icon M6 is dragged to the middle of the right bound of the screen, where an activation area is located. The activation area may be chosen by the device manufacturer or the user of the device. For example, it may be always in the right and vertically in the middle of the screen, or it may be also in the left and vertically in any desired position. The actual size of the area may be large or small depending on the user. In the example, icon M6 is dragged to the right bound and the device then determines that the user is wishing to start application M6.

In the next screenshot in FIG. 1, two layers 10 and 11 are visible. Layer 11 becomes visible when the user of the device drags layer 10 to the right bound of the screen. It can be seen that also the menu comprising elements M1-M6 changes to comprise elements M4-M8, when the icon M6 is dragged to the middle of the screen. This is because the main menu may comprise more icons than it is possible to display at once in a one column. However, instead of scrolling the menu it is also possible to use two or more columns. However, in many cases the main menu can be shown on the screen completely using a not scrolling layout. When M6 reaches the activation area, the layer becomes locked to its position and the user can conveniently use the menu comprising elements S1-S6, which are arranged on the second layer. In the example, the user of the device is wishing to choose S4. Icon S4 could be chosen similarly as M6 by dragging it to a determined activation area. However, in this example it is chosen by double clicking the icon. Instead of double clicking, it is possible to use only one click, one longer click or any other suitable activation.

In the example of FIG. 1, a third layer 12 is then presented when icon S4 has been activated. Layer 12 has further features S8-S10. There are several different applications that benefit from such features. In the example of FIG. 1, the second layer 11 is maintained on the screen, however, it is possible that it is removed when the third layer is chosen. For example, if the feature chosen from the first layer is a feature for contacting a person, then the second layer could show a list of persons. When the desired person has been chosen, the second layer is removed and the third layer is used for showing the possible ways of contacting, such as a phone call or e-mail. Furthermore, there may be additional layers. For example, there may be a transparent layer on top of layers 10-12. One example of such application that might benefit from this arrangement is a navigation application for car drivers or pedestrians. For example, if icon M6 activates the navigation application, a layer presenting the current location of the user of the device can be shown and layers 10 and 11 are presented transparently. Feature S4 could be "Navigate to a predetermined location" and icons S8-S10 could be locations that the user has programmed to the device. Layer 12 may be also transparent but as it is in the bottom of the screen it probably does not block information so it can be a regular non-transparent layer in order to provide better readability. When destination S10 is selected, layers 10-12 may be removed and a fourth layer 13 having a map will become visible with layer 10 which comprises the main menu.

In the example described above, the operation starts from layer 10. However, in the end only layer 13 with the map is visible because the user has chosen the full screen display. On layer 13, there may be one or more icons for providing the menu operations for the application. It is also possible that the layer has a shortcut to the main menu of the device in order to provide fast access to other applications when in full screen mode. It is possible that the layer with the map is still visible when new transparent layers are created on it. Thus, the user of the device can use different applications of the device and still maintain the navigation application available for driving or walking instructions.

Figure 2:
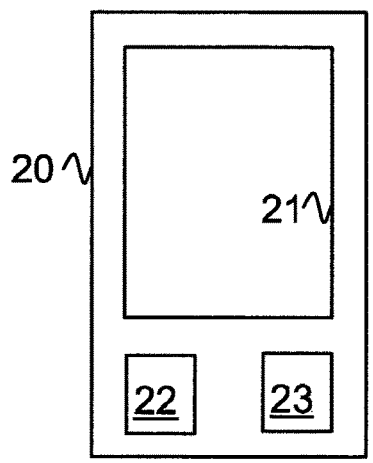
FIG. 2 is an example of a device according to the present invention.

FIG. 2 discloses a device according to the present invention. The device 20 comprises a touch-sensitive display 21, a common computing means 22 and a set of orientation sensors 23. The common computing means 22 includes the components that are known to a person skilled in the art and necessary for implementing devices such as a smart phone. These components comprise, for example, a processor, memory and bus. These components are configured to execute the computing tasks needed for implementing the layer-based user interface disclosed above. The set of orientation sensors 23 is just one example of additional means that can be used for commanding the user interface. The example of FIG. 2 does not comprise a keypad but it may be included.

Figure 3:
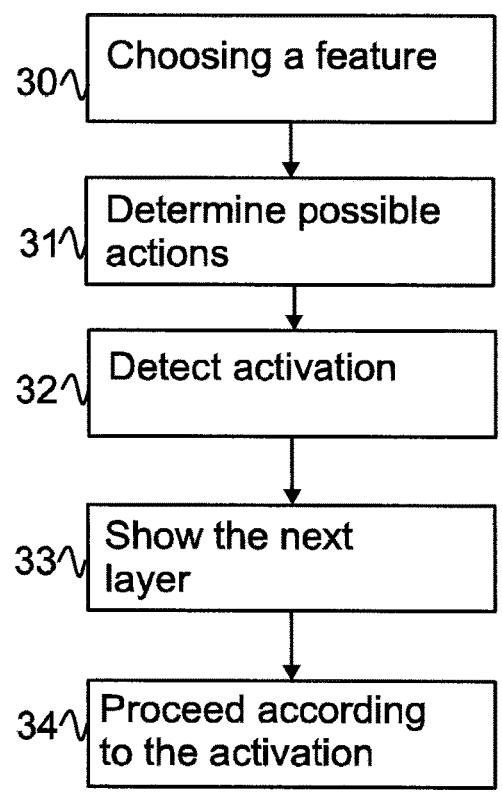
FIG. 3 is an example of a method according to the present invention.

FIG. 3 discloses a method according to the present invention. In the method, one possible use case is disclosed. The method is configured to work in the device of FIG. 2. The method is initiated by choosing a feature, such as M4 of FIG. 1, step 30. The device is configured to detect feature M4. A detection process then determines the further possibilities that can be performed with the feature, step 31. Then the device is arranged to detect if the feature is activated, step 32. The activation may be done, for example, by double clicking or dragging the icon of feature M4 to an activation area. The activation area may be arranged in any place on the screen, for example at the top or on the right of the viewport. The location of the activation area may be chosen by the user of the device or it may be forced by the application designer. As part of the activation, the device shows the layer that is revealed when the top layer is dragged, step 33. In case of double clicking, or similar act, the new layer is shown according to predetermined options. When the activation has been performed, the device then proceeds to the next level in the user interface hierarchy or launches the application according to the activated feature, step 34. The application may be launched and displayed in the revealed layer or it may instantly go to the full screen mode.

In a further embodiment the functionality is grouped or categorized. In a preferred grouping all of the functions are arranged into four different groups. The groups may be, for example, "Act", "Personal", "Share&Buy" and "Browse". Groups are activated by pulling down, left, up and right respectively. Thus, by pulling up the user activates group "Act" which causes, for example, making a call from dial pad, making a search from Google or similar, starting music player, creating a calendar entry or message etc. Pulling left activates group "Personal", which causes; for example, showing recent calls, changes in personal network, my folder, recently played songs etc. Pulling up activates group "Share&Buy", which causes for example, retrieve or update contacts in LinkedIn, Facebook or similar, buy music, share your own song etc. Pulling right activates group "Browse", which causes for example, browsing contact book, Internet bookmarks, received messages etc. The grouping mentioned above is only one example embodiment and different groups may be chosen. However, in preferred embodiment the grouping is the same in all applications. Same four directions apply in the basic mode and different applications, such as in music player, www-browser, camera application etc. When the directions are the same in all of the applications the user will learn to use it faster. It also causes better user experience. In more advanced embodiment the applications are configured so that the user may choose his/hers own grouping. Beneficially the functions are grouped into four different groups because of four natural directions, however, also other grouping options are possible.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for providing a user interface in a computing device, the method comprising:
   arranging a plurality of components in a plurality of layers, a first layer of the plurality of layers being visible and a second layer of the plurality of layers being at least partially invisible;
   choosing a desired feature from the first layer by activating at least one of said components;

said first layer and second layer being movable in relation to each other, wherein a dragging gesture in one of at least two possible directions moves said at least one activated component from the first layer to a predetermined activation area to cause further previously invisible second layer to become visible by revealing as the activated component is dragged, said second layer which was previously invisible and has become visible is defined by said dragging of said at least one activated component;

launching an application corresponding to the activated component according to the chosen feature, wherein in response to said launching the application, activating the second layer that was previously invisible and has become visible; and wherein said components are arranged into a plurality of groups and said groups are assigned a direction for launching said group.

2. The method according to claim 1, wherein said plurality of components are arranged into a scrollable menu.

3. The method according to claim 1, wherein said plurality of components are arranged into a non-scrollable menu.

4. The method according to claim 1, wherein said plurality of components are active components arranged to retrieve the visualization of the component from a network service.

5. The method according to claim 1, wherein said layers further comprise sub-layers having at least one component.

6. The method according to claim 1, wherein triggering a component includes at least one of the following: time-based trigger, application-based trigger, pressure-based trigger and orientation-based trigger.

7. A computer program comprising a non-transitory, tangible computer readable storage medium within a computing device and executable by the computing device to provide a user interface, comprising:

arranging a plurality of components in a plurality of layers, a first layer of the plurality of layers being visible and a second layer of the plurality of layers being at least partially invisible;

choosing a desired feature from the first layer by activating at least one of said components;

said first layer and second layer being movable in relation to each other, wherein a dragging gesture in one of at least two possible directions moves said at least one activated component from the first layer to a predetermined activation area to cause further previously invisible second layer to become visible by revealing as the activated component is dragged, said second layer which was previously invisible and has become visible is defined by said dragging of said at least one activated component;

launching an application corresponding to the activated component according to the chosen feature, wherein in response to said launching the application, activating the second layer that was previously invisible and has become visible; and wherein said components are arranged into a plurality of groups and said groups are assigned a direction for launching said group.

8. An apparatus comprising means for executing a computer program embodied on a non-transitory, tangible computer readable storage medium within a computing device and executable by the computing device to provide a user interface, comprising:

arranging a plurality of components in a plurality of layers, a first layer of the plurality of layers being visible and a second layer of the plurality of layers being at least partially invisible;

choosing a desired feature from the first layer by activating at least one of said components;

said first layer and second layer being movable in relation to each other, wherein a dragging gesture in one of at least two possible directions moves said at least one activated component from the first layer to a predetermined activation area to cause further previously invisible second layer to become visible by revealing as the activated component is dragged, said second layer which was previously invisible and has become visible is defined by said dragging of said at least one activated component;

launching an application corresponding to the activated component according to the chosen feature, wherein in response to said launching the application, activating the second layer that was previously invisible and has become visible; and wherein said components are arranged into a plurality of groups and said groups are assigned a direction for launching said group.

9. The apparatus according to claim 8, wherein the apparatus comprises control means, wherein the control means is at least one of the following: a touch sensitive display, an orientation sensor and a keypad.

10. The apparatus according to claim 8, wherein the apparatus comprises a network connection.

11. The apparatus according to claim 8, wherein the apparatus is a mobile phone.

12. The method according to claim 1, wherein the dragging gesture is in one of two to four directions.

13. The computer program according to claim 7, wherein the dragging gesture is in one of two to four directions.

14. The apparatus according to claim 8, wherein the dragging gesture is in one of two to four directions.

* * * * *